(12) United States Patent
Yang

(10) Patent No.: US 10,678,930 B2
(45) Date of Patent: Jun. 9, 2020

(54) GENERATING FILES HAVING COLUMN-ORIENTED LAYOUTS

(71) Applicant: LOGPRESSO INC., Seoul (KR)

(72) Inventor: Bongyeol Yang, Seoul (KR)

(73) Assignee: LOGPRESSO INC., Seoul (KR)

( * ) Notice: Subject to any disclaimer, the term of this patent is extended or adjusted under 35 U.S.C. 154(b) by 0 days.

(21) Appl. No.: 16/165,441

(22) Filed: Oct. 19, 2018

(65) Prior Publication Data

US 2019/0050582 A1 Feb. 14, 2019

Related U.S. Application Data

(63) Continuation of application No. PCT/KR2017/003618, filed on Apr. 3, 2017.

(30) Foreign Application Priority Data

Apr. 20, 2016 (KR) ........................ 10-2016-0047960

(51) Int. Cl.
| | |
|---|---|
| G06F 21/60 | (2013.01) |
| G06F 16/00 | (2019.01) |
| G06F 16/16 | (2019.01) |
| H04L 9/32 | (2006.01) |
| G06F 16/22 | (2019.01) |
| G06F 16/13 | (2019.01) |
| G06F 16/174 | (2019.01) |
| G06F 16/14 | (2019.01) |

(52) U.S. Cl.
CPC ............ *G06F 21/602* (2013.01); *G06F 16/00* (2019.01); *G06F 16/137* (2019.01); *G06F 16/152* (2019.01); *G06F 16/16* (2019.01); *G06F 16/1744* (2019.01); *G06F 16/221* (2019.01); *H04L 9/3239* (2013.01); *H04L 9/3242* (2013.01); *G06F 2221/2107* (2013.01)

(58) Field of Classification Search
CPC ...... G06F 21/602; G06F 16/221; G06F 16/16; G06F 16/137; G06F 16/1744; G06F 16/00; G06F 16/152; G06F 2221/2107; H04L 9/3239; H04L 9/3242
USPC ........................................................ 713/189
See application file for complete search history.

(56) References Cited

U.S. PATENT DOCUMENTS

| | | | |
|---|---|---|---|
| 9,124,418 B2 | 9/2015 | Willoughby | |
| 9,673,976 B2 | 6/2017 | Willoughby | |
| 2005/0097315 A1* | 5/2005 | Carmeli | H04L 63/0428 713/160 |

(Continued)

FOREIGN PATENT DOCUMENTS

| | | |
|---|---|---|
| EP | 2168300 B1 | 11/2015 |
| KR | 10-2006-0023493 A | 3/2006 |
| KR | 10-2013-0045759 A | 5/2013 |

(Continued)

*Primary Examiner* — Michael S McNally
(74) *Attorney, Agent, or Firm* — Nelson Mullins Riley & Scarborough LLP; Kongsik Kim, Esq.

(57) ABSTRACT

A computer-implemented method is provided herein of generating a file having a column-oriented layout and having a file header and a data block. The method includes a step of inserting length information of an encryption vector into the data block; a step of inserting the encryption vector into the data block; and a step of inserting data array of the encrypted column after referring to the encryption vector.

10 Claims, 3 Drawing Sheets

(56) References Cited

U.S. PATENT DOCUMENTS

2006/0050889 A1 3/2006 Lee
2014/0013112 A1* 1/2014 Cidon ................ G06F 21/6218
                 713/165

FOREIGN PATENT DOCUMENTS

| KR | 10-2014-0025146 A | 3/2014 |
| KR | 10-2015-0040583 A | 4/2015 |
| WO | 2008/048748 A1 | 4/2008 |
| WO | 2008/151935 A1 | 12/2008 |

* cited by examiner

GENERATING FILES HAVING COLUMN-ORIENTED LAYOUTS

CROSS-REFERENCE TO RELATED APPLICATION

This application is a continuation of International Application No. PCT/KR2017/003618, filed on Apr. 3, 2017, which claims priority to Korean Application No. 10-2016-0047960, filed on Apr. 20, 2016. Both applications are incorporated herein by reference in their entirety.

TECHNICAL FIELD

The present disclosure relates to methods, devices, and systems for generating files having column-oriented layouts, and more specifically, to methods, devices, and systems for generating files having column-oriented layouts that improve data security and query speed by selective encryption to the columns.

BACKGROUND

In a hyper-connected era, a large amount of sensor data is collected from various machines in real-time. There has been a technique used that multi-dimensionally analyzes the data through a preprocess, for example through creation of an OLAP (online analytical processing) cube or the like.

Column-oriented database techniques have also been developed after the MonetDB/X100 execution engine appeared in 2005, thereby necessitating analysis of a large amount of data at a high speed without performing a preprocess.

Data security can be important in storing and analyzing big data in order to conform to various legal regulations and client's needs. In particular, encryption of data is essential for data security.

In various prior art references, transparent data encryption methods that encrypt page units of data files have been carried out for data security. In the prior art, entire pages of data files should be encrypted, and the encrypted entire pages should be decrypted for query and analysis. This requirement for entire page encryption and decryption can lead to performance degradation.

Thus, improved methods, devices, and systems are needed to avoid degradation.

SUMMARY

Methods, systems, and devices are provided for generating a file having a column-oriented layout, and more specifically, for generating a file having a column-oriented layout that can be analyzed at a high speed compared with the prior art. In one embodiment, a method of generating a file having a column-oriented layout is provided that can solve one or more problems described above.

In another embodiment, a computer-implemented method is provided for generating a file having a column-oriented layout and including a file header and a data block. The method includes a step of inserting information of length of an encryption vector into the data block; a step of inserting the encryption vector into the data block; and a step of inserting data array of the encrypted column after referring to the encryption vector.

The data array to be inserted may consist of encryption data of compressed data array. The encryption vector may be a vector that has 0 or 1 in the bit corresponding to the order of column to be encrypted and has 1 or 0 in the bit corresponding to the order of column which is not encrypted. The method may further include a step of inserting an initial vector into the data block; and inserting an authentication code into the data block. The authentication code may be a hashing value of data block area.

In another aspect, a computer-implemented method is provided for querying the file generated by the above method. The method includes a step of receiving information of a column to be queried; a step of decrypting the column if the column is an encrypted column in the result of referring to the encryption vector; and a step of querying the data array of the decrypted column.

BRIEF DESCRIPTION OF DRAWINGS

The invention will be more fully understood from the following detailed description taken in conjunction with the accompanying drawings.

Figure 1:
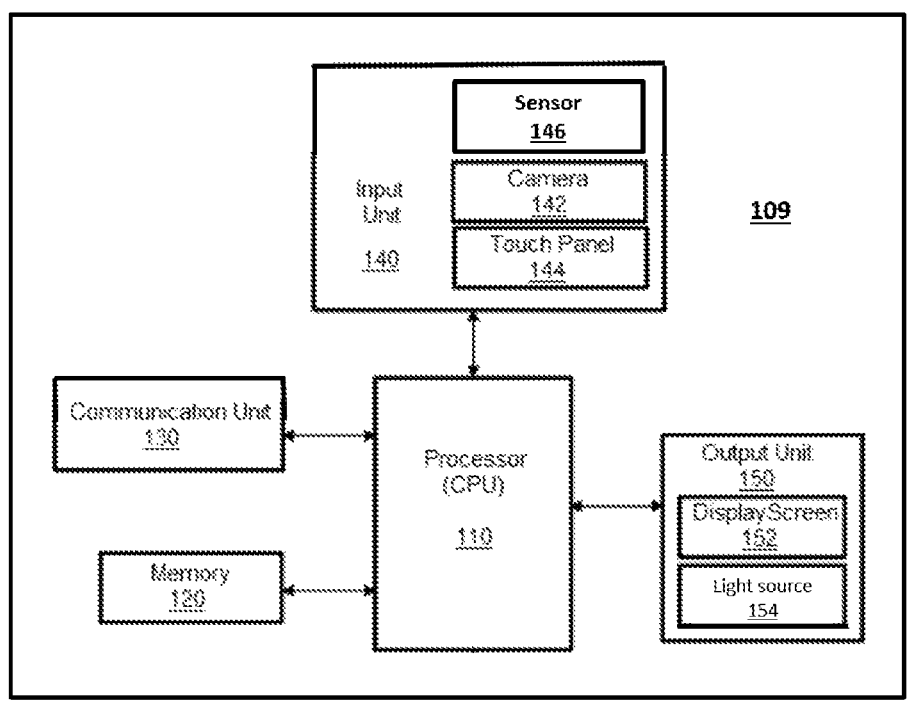
FIG. 1 shows one embodiment of an example diagrammatic view of a device architecture.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The method according to the present disclosure can be carried out by an electronic arithmetic device such as a computer, tablet, mobile phone, portable computing device, stationary computing device, etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A variety of devices can be used herein. FIG. 1 illustrates an example diagrammatic view of an exemplary device architecture according to embodiments of the present disclosure. As shown in FIG. 1, a device 109 may contain multiple components, including, but not limited to, a processor (e.g., central processing unit (CPU) 110, a memory 120, a wired or wireless communication unit 130, one or more input units 140, and one or more output units 150. It should be noted that the architecture depicted in FIG. 1 is simplified and provided merely for demonstration purposes. The architecture of the device 109 can be modified in any suitable manner as would be understood by a person having ordinary skill in the art, in accordance with the present claims. Moreover, the components of the device 109 themselves may be modified in any suitable manner as would be understood by a person having ordinary skill in the art, in accordance with the present claims. Therefore, the device architecture depicted in FIG. 1 should be treated as exemplary only and should not be treated as limiting the scope of the present disclosure.

The processor 110 is capable of controlling operation of the device 109. More specifically, the processor 110 may be operable to control and interact with multiple components installed in the device 109, as shown in FIG. 1. For instance, the memory 120 can store program instructions that are executable by the processor 110 and data. The process described herein may be stored in the form of program instructions in the memory 120 for execution by the processor 110. The communication unit 130 can allow the device 109 to transmit data to and receive data from one or more external devices via a communication network. The input unit 140 can enable the device 109 to receive input of various types, such as audio/visual input, user input, data input, and the like. To this end, the input unit 140 may be composed of multiple input devices for accepting input of various types, including, for instance, one or more cameras 142 (i.e., an "image acquisition unit"), touch panel 144, microphone (not shown), sensors 146, keyboards, mice, one or more buttons or switches (not shown), and so forth. The term "image acquisition unit," as used herein, may refer to the camera 142, but is not limited thereto. The input devices included in the input 140 may be manipulated by a user. The output unit 150 can display information on the display screen 152 for a user to view. The display screen 152 can also be configured to accept one or more inputs, such as a user tapping or pressing the screen 152, through a variety of mechanisms known in the art. The output unit 150 may further include a light source 154. The device 109 is illustrated as a single component, but the device may also be composed of multiple, separate components that are connected together and interact with each other during use.

The device 109 can thus be programmed in a manner allowing it to generate various exemplary files having column-oriented layouts, and more specifically, to generate various exemplary files having column-oriented layouts that improve data security and query speed by selective encryption to the columns.

Figure 2:
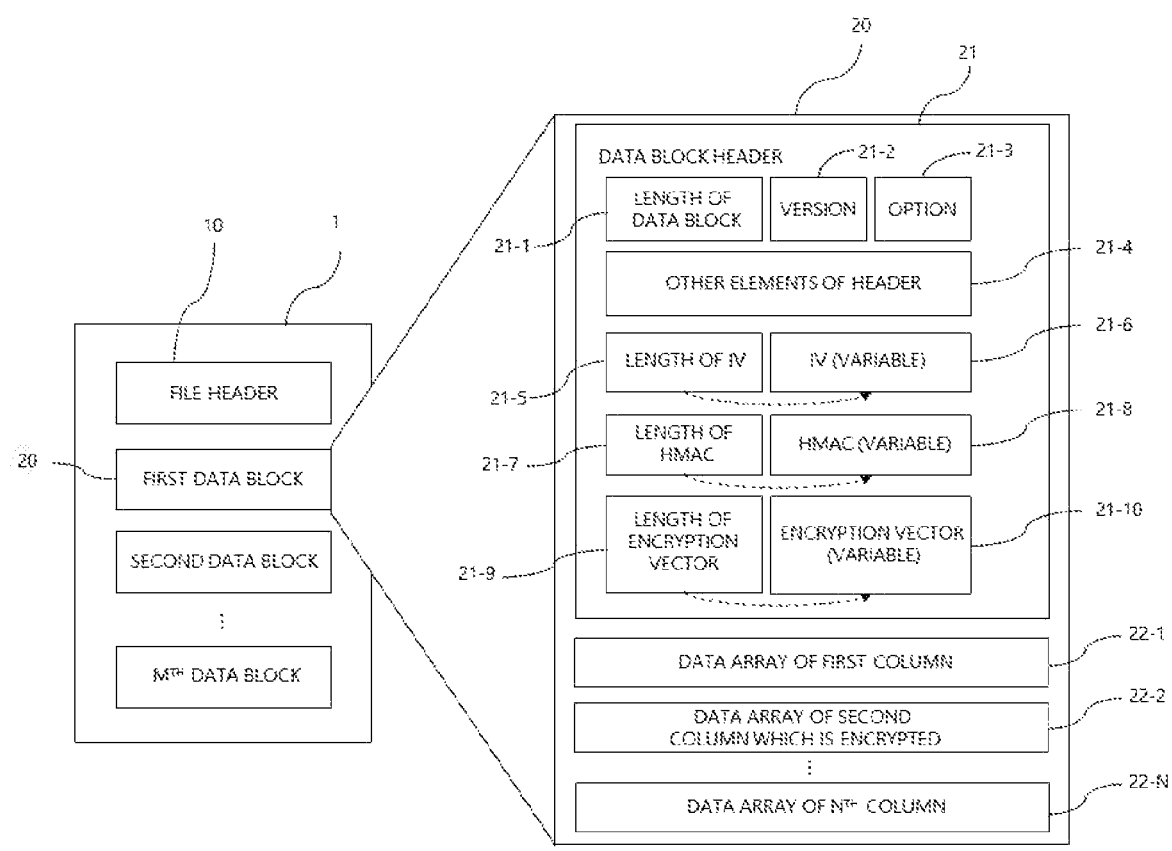
FIG. 2 shows one embodiment of a structure of a file generated.

FIG. 2 shows a structure of a file that has a column-oriented layout according to one embodiment of the present disclosure. According to the present disclosure, the elements of the file are generated by a computer and then are inserted to a file structure. The file with a column-oriented layout can have at least a file header 10 and data blocks. The data block(s) 20 includes a data block header 21 and data arrays 22-1, 22-2, . . . , 22-N.

The data block header 21 can include information of length of data block 21-1, information of version 21-2, information of option 21-3, information of other elements of header 21-4, information of length of initial vector 21-5, initial vector 21-6, information of length of HMAC (Hash-based Message Authentication Code) 21-7, HMAC 21-8, information of length of encryption vector 21-9, and encryption vector 21-10.

In some examples, one bit in the information of the option 21-3 may indicate whether the header element relating to encryption is inserted in the data block. Initial vector (IV) can be used in some embodiments for encryption. HMAC (Hash-based Message Authentication Code) can be obtained by hashing an entire block data area. The initial vector 21-6 and the HMAC 21-8 can be generated as being variable. The length of the initial vector and HMAC can be determined according to the algorithm of encryption and HMAC, which are designated when generating a table. For example in some embodiments, the length of initial vector can be 16 bytes in AES128 encryption.

The encryption vector 21-10 can be a vector of bytes, each bit of which indicates whether the column corresponding to the bit is encrypted or not. For example, if a data block consists of eight columns and only the second column is encrypted, the encryption vector can be "01000000." If a data block consists of four columns and the second and fourth column are encrypted, the encryption vector can be "01010000." Because the encryption vector is a vector of bytes, the latter four bits can be encoded by "0." Alternatively in various embodiments, the encryption vector can have "0" in the bit corresponding to the order of the encrypted column and "1" in the bit corresponding to the order of the column that is not encrypted. In the alternative embodiment, the encryption vectors for the two aforementioned examples can be "10111111" and "10100000." The form of the encryption vector is not limited to the mentioned specific form(s), however, and may have any form of vector if it shows the information of the column to be encrypted.

The encrypted data array can be inserted into the data block by referring to the encryption vector. A data column that is not encrypted can be inserted into the data block as plain data array 22-1. Column data array can take a variety of forms. For example, the data can be unstructured data, may be RLE-encoded (Run Length Encoded), may be dictionary-encoded, or may be compressed by deflate or snappy compression algorithm. If the compressed data column is encrypted, the performance of encryption/decryption can be improved through this process.

The data array of the second column can be encrypted and then can be inserted into the first data block 20 as the data array 22-2 of the encrypted second column. The data arrays 22-1, 22-N of the first and the Nth columns can be inserted into the first data block without encryption.

Figure 3:
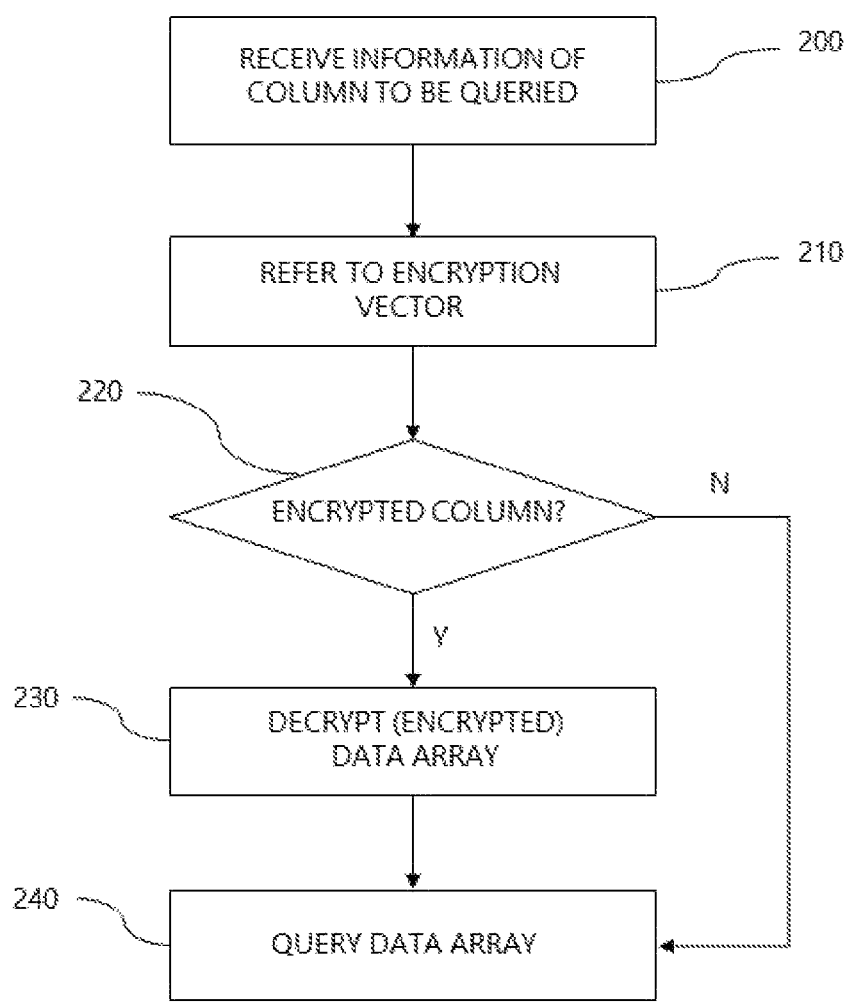
FIG. 3 shows one embodiment of a flows chart of look-up process of the file generated.

As illustrated in FIG. 3, the information of the column to be queried can be received 200; the encryption vector 21-10 of the data block header 21 can be referred to 210; and then it can be determined whether the column to be queried is encrypted or not 220. If it is determined that the column to be queried is encrypted, the data array of the column can be decrypted 230 and then the decrypted data can be queried 240. If it is determined that the column to be queried is not encrypted, the data can be queried without decryption.

The data of the column that requires encryption among various columns of a file that has column-oriented layout can be selectively encrypted. Thus, only the encrypted column can be decrypted when the file is queried. This process is faster and more efficient when compared with the prior art that encrypt entire pages of data file.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A computer-implemented method of generating a file having a column-oriented layout, a file header, and a data block, the method comprising:
   inserting, by a processor, length information of an encryption vector into the data block;
   inserting, by a processor, the encryption vector into the data block; and
   inserting, by a processor, a data array of an encrypted column into the data block after referring to the encryption vector.

2. The computer-implemented method of claim 1, wherein the data array to be inserted consists of encryption data of a compressed data array.

3. The computer-implemented method of claim 2, wherein the encryption vector is a vector that has 0 or 1 in a bit corresponding to an order of column to be encrypted and has 1 or 0 in the bit corresponding to the order of column which is not encrypted.

4. The computer-implemented method of claim 2, further comprising a step of inserting an initial vector into the data block; and inserting authentication code into the data block.

5. The computer-implemented method of claim 4, wherein the authentication code is a hashing value of data block area.

6. A method for querying the file having column-oriented layout generated by the method of claim 2, comprising:
   receiving information of a column to be queried;
   decrypting the column if the column is an encrypted column by referring to the encryption vector; and
   querying the data array of the decrypted column.

7. The computer-implemented method of claim 1, wherein the encryption vector is a vector that has 0 or 1 in a bit corresponding to an order of a column to be encrypted and has 1 or 0 in the bit corresponding to the order of the column that is not encrypted.

8. The computer-implemented method of claim 1, further comprising a step of inserting an initial vector into the data block; and inserting an authentication code into the data block.

9. The computer-implemented method of claim 8, wherein the authentication code is a hashing value of data block area.

10. A method for querying the file having column-oriented layout generated by the method of claim 1, comprising:
    receiving information regarding a column to be queried;
    decrypting the column if the column is an encrypted column by referring to the encryption vector; and
    querying the data array of the decrypted column.

* * * * *

UNITED STATES PATENT AND TRADEMARK OFFICE
CERTIFICATE OF CORRECTION

PATENT NO. : 10,678,930 B2  
APPLICATION NO. : 16/165441  
DATED : June 9, 2020  
INVENTOR(S) : Bongyeol Yang Page 1 of 1

It is certified that error appears in the above-identified patent and that said Letters Patent is hereby corrected as shown below:

On the Title Page

Item (73) Assignee:
Please delete "LOGPRESO INC." and insert -- LOGPRESSO INC. --

Signed and Sealed this
Eighteenth Day of August, 2020

Andrei Iancu
*Director of the United States Patent and Trademark Office*